United States Patent [19]

Eggert

[11] 3,998,320
[45] Dec. 21, 1976

[54] PLASTIC BOTTLE ESCAPEMENT DEVICE AND METHOD

[75] Inventor: Noel B. Eggert, Toledo, Ohio

[73] Assignee: Owens-Illinois, Inc., Toledo, Ohio

[22] Filed: Feb. 23, 1976

[21] Appl. No.: 660,309

[52] U.S. Cl. .............................. 198/463; 198/406; 198/491; 221/301
[51] Int. Cl.[2] ........................................ B65G 47/06
[58] Field of Search .................. 198/26, 28, 29, 30, 198/278, 279, 20 R; 193/21, 32; 221/293, 297, 299, 301; 214/1 BD, 147 R, 147 T

[56] References Cited

UNITED STATES PATENTS

| 1,008,429 | 11/1911 | Osmer | 221/301 |
|---|---|---|---|
| 1,508,369 | 9/1924 | Johnson | 198/26 |
| 2,313,478 | 3/1943 | Neja | 198/26 X |
| 2,558,633 | 6/1951 | Tuttle | 198/26 |
| 3,392,815 | 7/1968 | Skeels et al. | 198/31 AA |
| 3,556,282 | 1/1971 | Moeltzner | 198/28 X |
| 3,756,362 | 9/1973 | Pearce | 221/301 X |
| 3,776,346 | 12/1973 | Dubuit | 198/26 X |
| 3,926,336 | 12/1975 | Graham et al. | 198/22 B |

FOREIGN PATENTS OR APPLICATIONS

| 16,178 | 11/1912 | United Kingdom | 221/297 |

Primary Examiner—John J. Love
Assistant Examiner—Richard K. Thomson
Attorney, Agent, or Firm—Robert F. Rywalski; Edward J. Holler

[57] ABSTRACT

A method and apparatus for controllably dispensing upright bottles onto a continuous conveyor is provided wherein the bottles are supplied from a duct and there is provided at least two opposed pivotal members each of the pivotal members carrying bottle supporting surfaces at an upper portion and complementary bottle stabilizing and restraining nest defining portions at a lower portion of the pivotal members, the method includes pivotally moving the members so that the supporting surfaces move in an upper path which includes a bottle supporting position and a non-supporting position and the complementary bottle stabilizing and restraining nest defining portions move in a lower path which includes a bottle stabilizing and restraining nest forming position and a bottle release position, supplying an upright bottle from above the supporting surfaces, supporting the bottle on said supporting surfaces when the surfaces are in one location in the upper path, releasing the bottle downwardly when said surfaces are in another location in the upper path, allowing the bottle to contact a conveyor and restraining and stabilizing the bottle on the conveyor with the complementary nest portions when the nest portions are in one location in the lower path, releasing the bottle when the nest portions are in another location in the lower path and supporting another bottle on the supporting surfaces while the nest portions are in a bottle releasing position.

13 Claims, 5 Drawing Figures

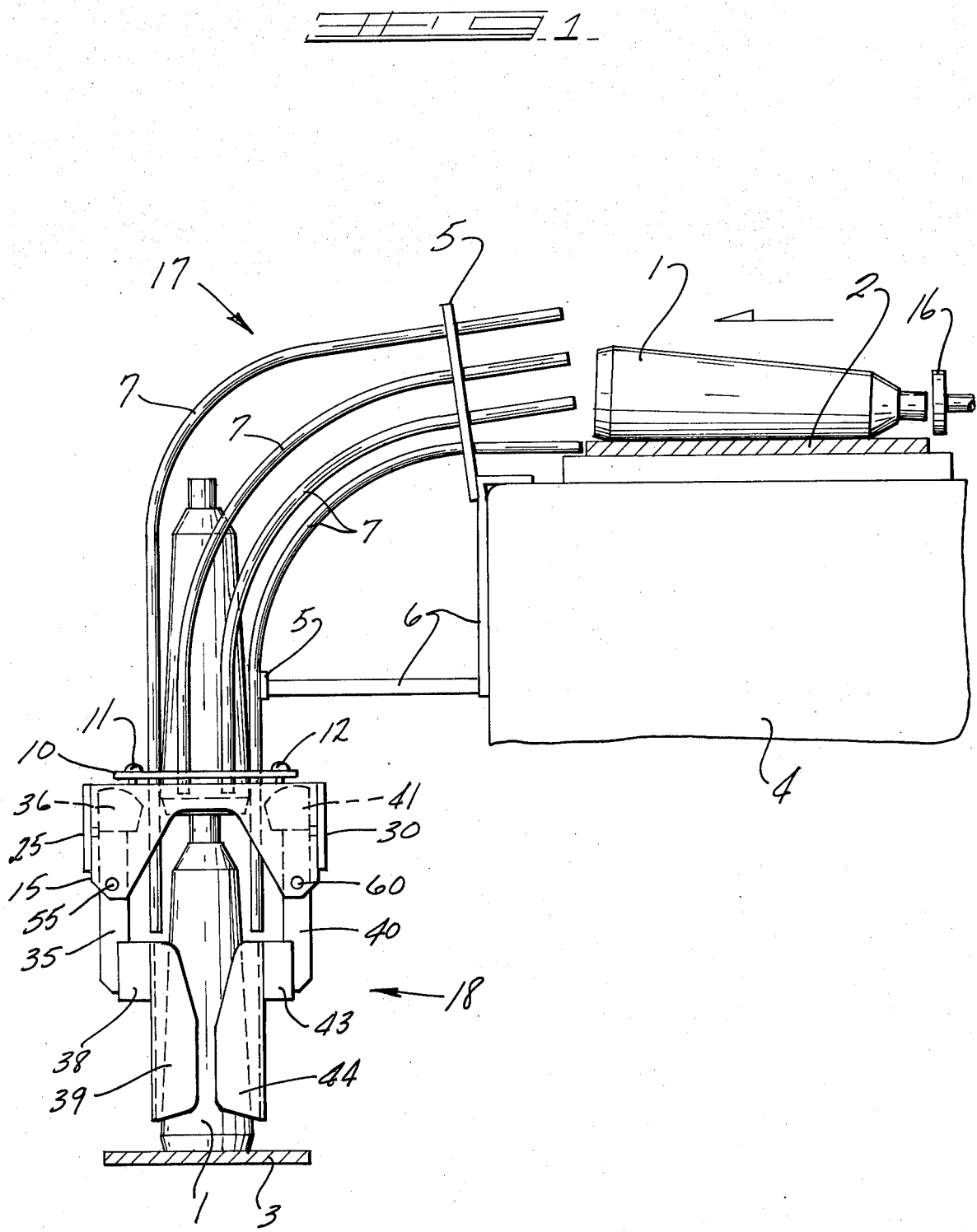

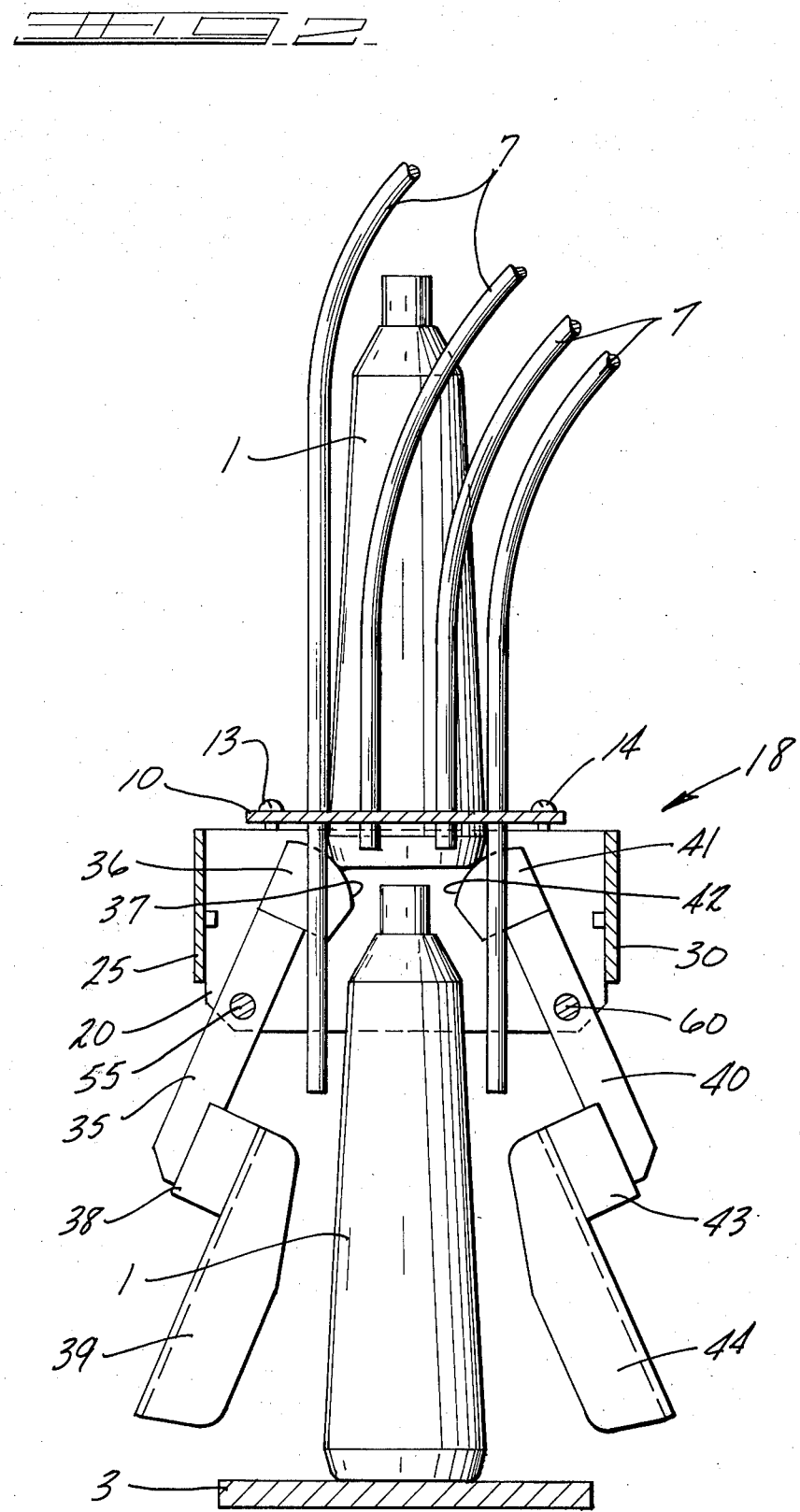

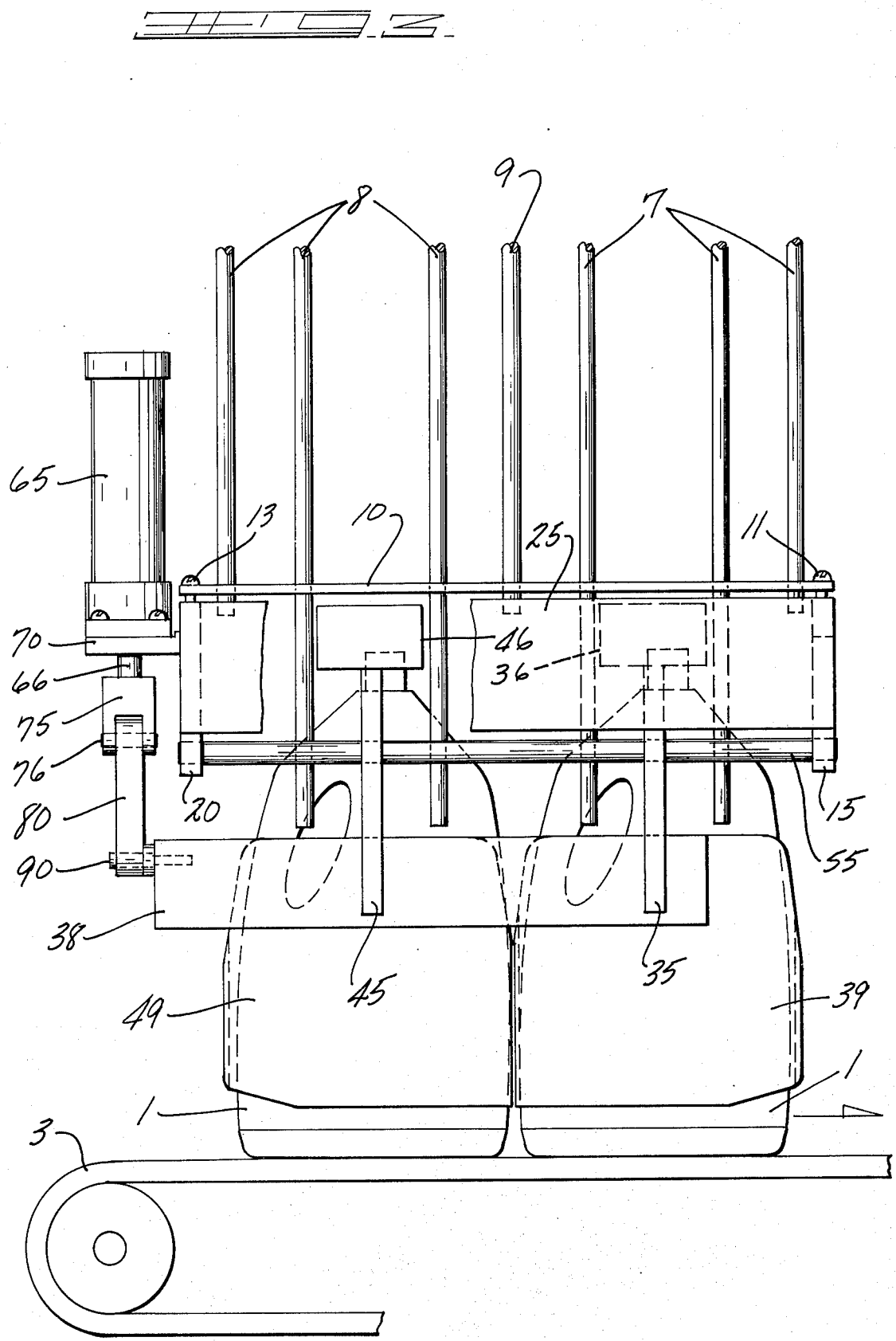

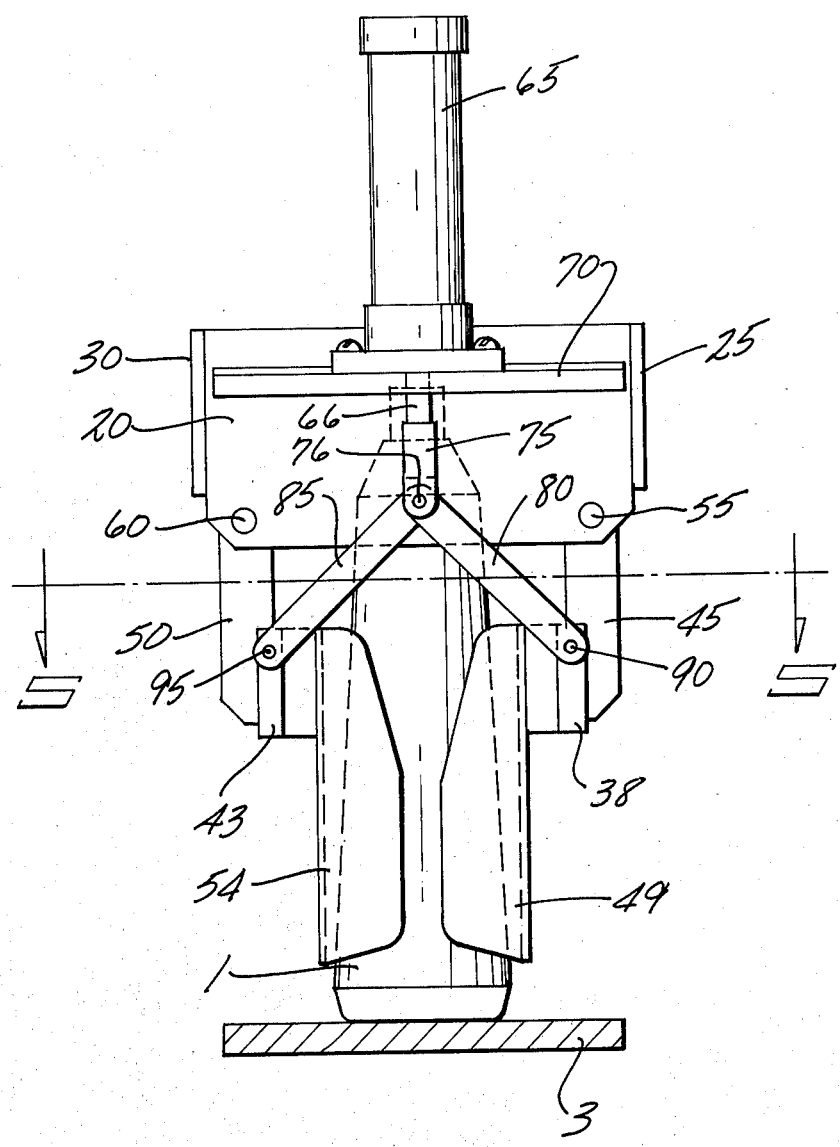

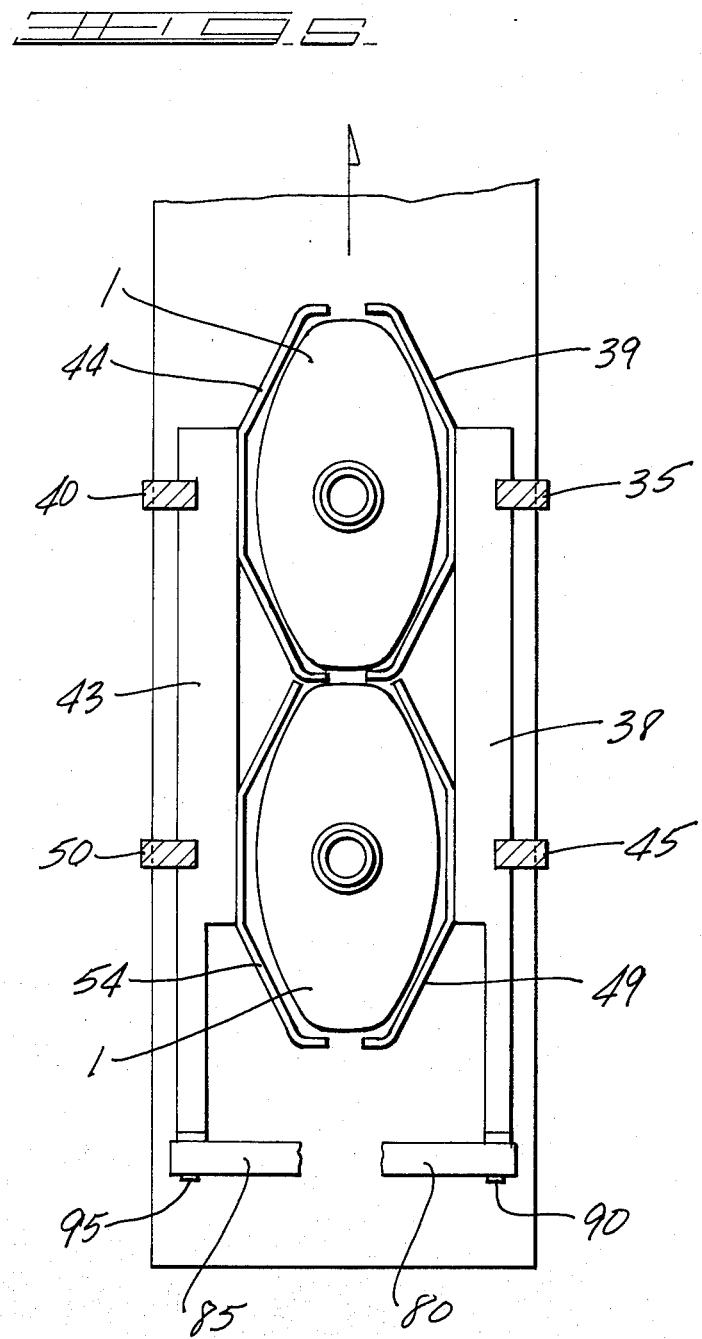

PLASTIC BOTTLE ESCAPEMENT DEVICE AND METHOD

THE INVENTION

The present invention is directed to the manufacture and production of plastic bottles; more particularly, it is directed to methods and apparatus for controllably dispensing plastic bottles onto a conveyor. Still more particularly, the invention is directed to methods and apparatus for transposing a sidewise bottle to an upright position and then controllably dispensing the uprighted bottle onto a continuously moving conveyor.

In numerous plastic bottle manufacturing processes, for example the blow molding of such bottles from a wheel type blow molding machine, the blown containers are supplied on a continuous conveyor, in a sidewise position, and for purposes of expedient and low cost production it is desirable to be able to transpose such sidewise bottle to an upright position and feed the uprighted bottle to another conveyor. This latter conveyor then leads to any auxiliary finishing operations that may be needed and/or directly to a bottle loading position. Thus it will be readily apparent that there is a need in the art for providing methods and apparatus for transposing a sidewise bottle to an upright position and then controllably dispensing an upright bottle onto a moving conveyor. Equipment which is commercially available does not satisfy this need in that problems exist with regard to consistent and reliable operation.

Thus, in accordance with this invention methods and apparatus are provided which satisfy the need in the art and solves a problem in the art by providing for a system which reliably, expediently, and economically provides for transposing of sidewise containers to an upright position and then controllably dispensing the uprighted bottles onto a moving conveyor. In a preferred embodiment of this invention the operation is effected in tandem whereby bottles are tendemly and controllably dispensed to a single moving conveyor where they are then removed, either to additional finishing operations and/or directly to a final packaging point.

Thus in accordance with one embodiment of this invention there is provided an apparatus for uprighting bottles and controllably dispensing the uprighted bottles onto a bottle conveyor comprising: means supporting a bottle sidewise, duct means for receiving a bottle sidewise and transposing it and furnishing it to an upright position, means for feeding the said sidewise bottle to said duct means, opposed bottle supporting surfaces beneath said upright position movable inwardly and outwardly in an upper arcuate path between a bottle supporting position and a non-supporting position, opposed complementary bottle restraining and stabilizing nest defining portions beneath the supporting surfaces movable inwardly and outwardly in a lower arcuate path between a bottle restraining and stabilizing nest defining position and a non-restraining position, means operatively connected to said supporting surfaces and said nest portions for moving said supporting surfaces inwardly and outwardly while the nest portions respectively simultaneously move outwardly and inwardly, a moving conveyor beneath said bottle restraining and stabilizing nest defining position of said complementary nest portions, the apparatus being so arranged and constructed that a bottle is supported in an upright position by the supporting surfaces when they are in one location of the upper path and the bottle is released downwardly when the surfaces are in another location of the upper path and the downwardly released bottle then contacts the conveyor and is restrained and stabilized from transverse movement along the conveyor when the nest portions are in one location of the lower path and the bottles are then released and allowed to be transversely moved on the conveyor when the nest portions are in another location. In the preferred embodiment the apparatus will generally be a tandemly arranged apparatus whereby bottles in tandem are supplied to a single conveyor for movement away from the dispensing device to a bottle finishing or packaging area.

In accordance with another embodiment of this invention, there is provided a method for controllably dispensing and releasing a supply of bottles onto a continuous conveyor comprising providing two opposed pivotal members each of said members carrying an upper arcuate bottle supporting surface and a lower inwardly opening pocket, which pockets when in proximity to each other define a bottle stabilizing and restraining nest, restraining a lower bottle within the defined stabilizing and restraining nest and supporting an upper bottle on the top of the lower bottle, pivotally moving the opposed pivotal members so that the pockets move away from each other and release the lower bottle and the arcuate bottle supporting surfaces move toward each other to cam the upper bottle upwardly from the lower bottle, pivotally moving the pivotal members so that the supporting surfaces then move away from each other allowing the upper bottle to be released from its supporting engagement and fall downwardly in a vertically open zone while the lower pockets move toward each other and restrain the released bottle in the defined nest, followed by again sequentially supporting another bottle on the top of what was formerly the upper bottle. As indicated preferably the method like the apparatus will be operated in a tandem synchronized manner whereby uprighted bottles will be substantially simultaneously tandemly dispensed, e.g. two by two, onto a conveyor.

The foregoing as well as other embodiments and advantageous features of the present invention will be more clearly apparent by reference to the drawings wherein:

FIG. 1 is a side elevational view looking at the apparatus of this invention from the bottle exit side of the controlled dispensing apparatus of this invention;

FIG. 2 is a view similar to that of FIG. 1, portions being removed for purposes of simplification, and further exemplifying the operation of the method and apparatus of this invention;

FIG. 3 is a front elevational view, portions being removed for simplicity, more clearly showing the tandem operation of the present invention;

FIG. 4 is a simplified elevational view generally taken in the direction opposite that of FIG. 1 more clearly exemplifying a driving mechanism of the present invention;

FIG. 5 is a simplified plan view generally taken along the lines 5—5 of FIG. 4 and further exemplifies the tandem operation of the present invention.

Referring generally now to FIG. 1 there will be seen that there is provided a main support member 4 which support member includes brackets 6 and carries a conveyor generally designated 2. Conveyor 2 provides a supply of bottles 1 which are in a sidewise position and means, such as a pusher bar 16, are provided to remove the sidewise bottles from conveyor 2. Thus for example pusher bar 16 contacts the sidewise bottle and supplies it to an opening in suitable duct, or guide, means generally designated 17. Duct means 17 then receives the sidewise bottle and transposes it and transports it to a position where it is now disposed in an upright manner above the dispensing device, generally designated 18. Dispensing device 18, in a controlled fashion, then releases the bottles for transverse movement upon conveyor 3. Thus with respect to FIG. 1 the uprighted bottle 1 on conveyor 3 will be moved from beneath dispensing device 18 in a direction coming out of the plane of the drawings.

As indicated the operation of the present invention will desirably be done in tandem and thus the duct means generally represented as 17 will, as more clearly seen in FIG. 3, in effect be tandemly disposed duct means. Thus a first duct will be defined by a plurality of a peripheral array of tubular members 7 and the tandem duct will be defined by a plurality of a peripheral array of tubular members 8. Tubular member 9 may be a common member which defines a path for the movement of one bottle by the tubular members 8 and for the movement of another bottle by the tubular members 7. The tubular members which define the duct or guiding path for the bottles pass through open apertured support members 5 which latter members, in turn, are suitably mounted for support onto brackets 6. Of course, as will be apparent, pusher bar 16 will also be adapted to not only supply sidewise container to the guide duct defined by tubular members 7, but will also supply bottles to the guide duct defined by tubular members 8 in the tandem operation indicated.

Dispensing device 18 generally includes a main support panel 10 which is opened to receive and allow a tandem supply of bottles to pass therethrough. Tubular members 7 and 8 are generally welded, in a peripheral array, to main support panel 10 of the dispensing device 18, thereby providing support for the dispensing device. In passing, and as may be seen in FIGS. 1, 2, and 3 several of the tubular members 7 and 8 sidewise of the bottles proceed downwardly through main support panel 10 into, and helping to define, a vertical zone for guided dropping movement of the bottles as they are controllably handled in dispensing device 18.

Main support panel 10 of dispensing device 18, by suitable mounting bolts 11, 12, 13, and 14 respectively carries a panel 20 on the drive side of the dispensing device and a bottle exiting side panel 15. As will be readily apparent from FIG. 1 bottle exiting side panel 15 includes a keyway portion to allow for the egress of bottle 1 from beneath dispensing device 18 and to allow for the transverse movement of the bottle with conveyor 3. Dispensing device 18 also carries a front panel 25 and a rear panel 30 suitably mounted to panel 20 and to bottle exiting side panel 15 respectively.

Supported by panel 20 and bottle exiting side panel 15 is a front pivot pin, or rod, 55 and a rear pivot pin, or rod, 60 which generally run parallel to the direction of movement of conveyor 3. Pivotally mounted on pivot rods 55 and 60 are oppositely disposed rocker arms 35 and 40 and, displaced therefrom and in tandem therewith are oppositely disposed rocker arms 45 and 50. Each of the opposed rocker arms, 35 and 40 respectively, and 45 and 50 respectively, carry at an upper margin thereof an arcuate bottle supporting surface. While the bottle supporting surface may be formed directly on the respective rocker arms it is desirable to employ separate elements of a lubricious thermoplastic material such as for example high density polyethylene which are mounted in a unitary manner onto the respective rocker arms. Thus as will be seen rocker arm 35 carries a member 36 and rocker arm 40 carries a similar member 41, oppositely disposed to member 36, with each of members 36 and 41 generally having an upper arcuate inwardly and downwardly extending bottle supporting surface 37 and 42 respectively. Rocker arms 45 and 50 carry identically configured and disposed members with upper bottle supporting surfaces such as for example member 46 on rocker arm 45. Rocker arms 35 and 40 carry at a lower margin thereof elongate generally inwardly opened pockets, or complementary bottle stabilizing and restraining nest defining portions 39 and 44 respectively. In the same manner, rocker arms 45 and 50 respectively carry oppositely disposed complementary pockets 49 and 54 respectively. While pockets 39, 49, 54, and 44 may be carried at the lower margins of their appendant rocker arms, 35, 45, 50, and 40 respectively, in any suitable manner, front pockets 39 and 49 are connected to a movable and drivable front extension rod 38 which runs parallel to the direction of movement of conveyor 3 and which extension arm 38 is mounted and carried at a lower portion of rocker arms 35 and 45 thereby allowing for unitary movement. In a similar manner pockets 44 and 54 are carried at a lower margin of rocker arms 40 and 50 by employing a similar rear extension arm 43. As best illustrated in FIGS. 1 and 5 the complementary pockets, 39 and 44 respectively and 49 and 54 respectively, when brought into proximity to each other by pivotal movement of the rocker arms define a generally vertically elongate nest which stabilizes the bottles and restrains their transverse movement along conveyor 3.

Means are then provided for pivotally moving rocker arms 35 and 40 inwardly and outwardly in a synchronized manner and, of course, rocker arms 45 and 50 move in the same cycle. The pivotal movement of the rocker arms, for example rocker arms 35 and 40, causes the bottle supporting surface thereof, e.g. surfaces 37 and 42 of members 36 and 41 respectively to move inwardly and outwardly in a path which includes a bottle supporting position and a bottle releasing, or non-supporting, position. Similarly, moving in a direction opposite to the supporting surfaces, pockets 39 and 44, of rocker arms 35 and 40 respectively, as well as pockets 49 and 54, move outwardly and inwardly in a lower path which includes a bottle stabilizing and restraining nest forming position and a bottle release position. FIGS. 1 and 5 best illustrate the pockets in their bottle restraining and stabilizing position whereas FIG. 2 best illustrates the pockets in their bottle release position. FIG. 2 best illustrates the supporting surfaces in a bottle supporting position and FIG. 1 best illustrates the supporting surfaces in a non-supporting or bottle release position.

The pivotal movement is provided generally by employing an air cylinder 65 having a reciprocating piston rod 66. Air cylinder 65 is mounted on a suitable support 70 which in turn is mounted to panel 20. Adjacently downward of air cylinder 65 front extension rod 38 is loosely connected to a front linkage 80, for example by means of a pin 90. Similarly rear extension arm 43 is loosely connected to a rear linkage arm 85 by a pin 95. Piston rod 66 is connected to the upper portion of a clevis 75 and the linkages, 80 and 85 respectively, are joined into the clevis by means of a clevis pin 76. Thus as will be apparent the reciprocating motion of piston rod 66 causes the clevis 75 to move upwardly and downwardly which in turn drives and moves the upper portion of the linkages 80 and 85 upwardly and downwardly; those linkages in turn exert a force on the extension rods, 38 and 43 respectively, causing the pivotal unitary and synchronized movement of the rocker arms, and their respective appendant bottle supporting surfaces and pockets, whereby the bottles are controllably and sequentially supported, released, restrained and stabilized, and then released to conveyor 3 from dispensing device 18.

An exemplary mode of practicing this invention is to supply bottles 1 in a sidewise position to the duct, or guide, means 17 whereby the bottles are transposed and provided at an upright position. As indicated, for example in FIGS. 1 and 5, lower bottles are restrained and stabilized by the complementary pockets 39 and 44, and complementary pockets 39 and 54 in the defined bottle restraining and stabilizing nests; the lower bottles have upper bottles supported thereon (FIG. 1) while the bottle supporting surfaces, for example surfaces 37 and 42 of members 36 and 41, are in a non-supporting position. The movement of piston rod 66, along with the other operative connections, then, as best illustrated in FIG. 2, causes the pockets, for example 39 and 44, to move outwardly to an open position which releases the lower bottles and simultaneously the inwardly and downwardly disposed arcuate bottle supporting surfaces, for example 37 and 42, move inwardly to supportingly and cammingly lift the bottle previously supported on the lower bottle upwardly therefrom. As will be apparent continual movement allows the former upper bottles to be released and fall in a vertical path whereby those bottles are stabilized and restrained by the closed pockets and with another bottle now being supplied and taking the position of the former upper bottle.

Of course as will be readily apparent modifications of the present invention may be made which according to the patent statutes and laws do not depart from the spirit and scope thereof.

I claim:

1. An apparatus for controllably dispensing bottles in an upright position onto a supporting surface comprising a pair of oppositely disposed rocker arms pivotally movable from a first position to a second position each of said rocker arms carrying a bottle supporting surface at an upper portion thereof and an inwardly opening pocket at a lower portion, said rocker arms being so arranged and constructed so that when in said first position said bottle supporting surfaces are in a closed bottle supporting position and said pockets are in an open position and when in said second position said bottle supporting surfaces are in an open non-bottle supporting position and said pockets are in a closed position defining a bottle restraining and stabilizing nest; means guiding an upright bottle to a position which is vertically above said supporting surfaces when said rocker arms are in said first position and which is in alignment with the bottle stabilizing nest defined by said pockets when said rocker arms are in said second position; and means for pivotally moving said pair of rocker arms between said first and second positions.

2. The apparatus of claim 1 and futher including a second pair of rocker arms as described in claim 1 in tandem with said former pair of rocker arms, means as described in claim 1 guiding an upright bottle to a position vertically above the supporting surfaces and in alignment with the bottle stabilizing nests of the pockets of said second pair of rocker arms, said means for pivotally moving said former pair of rocker arms also pivotally moving said second pair of rocker arms.

3. The apparatus of claim 2 wherein said means for pivotal movement comprises front and rear extension rods respectively connected to front and rear rocker arms of said pairs of rocker arms, and driving means for moving said extension rods outwardly and inwardly.

4. The apparatus of claim 3 wherein said driving means comprises a first arm connected to one of said extension rods a second arm connected to the other extension rod, connecting means pivotally joining said first and second arms and means for moving said connecting means upwardly and downwardly.

5. The apparatus of claim 4 wherein said means for moving said connecting means comprises an air cylinder.

6. The apparatus of claim 3 wherein said inwardly open pockets are connected to said extension rods.

7. The apparatus of claim 2 including a conveyor disposed immediately beneath said pockets of said pairs of rocker arms.

8. A method for controllably dispensing and releasing a supply of bottles unto a continuous conveyor comprising,
   providing two opposed pivotal members, each of said members carrying upper arcuate bottle supporting surface and a lower inwardly opening pocket, which in proximity to each other define a bottle stabilizing and restraining nest,
   restraining a lower bottle within said bottle stabilizing and restraining nest defined by said pockets and supporting an upper bottle on the top of said lower bottle,
   pivotally moving said members so that said pockets move away from each other and release said lower bottle and said arcuate bottle supporting surfaces move toward each other to cam said upper bottle upwardly from said lower bottle,
   moving said members so that said supporting surfaces move away from each other allowing said upper bottle to be released from its supporting engagement and said lower pockets move toward each other and restrain said released bottle in said nest, and supporting another bottle on the top of said released restrained bottle.

9. The method of claim 8 wherein said method is tandemly performed.

10. A method for controllably dispensing upright bottles into a continuous conveyor comprising,
    providing two opposed pivotal members, each of said pivotal members carrying bottle supporting surfaces at an upper portion and carrying complementary bottle stabilizing and
    pivotally moving said members so that said supporting surfaces move in an upper path which includes a bottle supporting position and a bottle releasing position and said complementary bottle stabilizing and restraining nest portions move in a lower path which includes a bottle stabilizing and restraining nest forming position and a bottle release position,
    supplying an upright bottle from above said supporting surfaces, supporting said bottle on said supporting surfaces when said surfaces are in one location on said upper path, releasing said bottle downwardly when said surfaces are in another location on said path, allowing said bottle to contact said conveyor and restraining and stabilizing said bottle on said conveyor with said complementary nest portions when in one location on said lower path, releasing said bottle when said nest portions are in another location on said lower path, and supporting another bottle on said supporting surfaces while said nest portions are in a bottle releasing position.

11. The method of claim 10 wherein said method is tandemly performed.

12. An apparatus for uprighting bottles and controllably dispensing the uprighted bottles unto a bottle conveyor comprising:
 means supporting a bottle sidewise,
 duct means for receiving a bottle sidewise and transposing it to an upright position,
 means for feeding said sidewise bottle to said duct means,
 opposed bottle supporting surfaces beneath said upright position movable inwardly and outwardly in an upper arcuate path between a bottle supporting position and a non-supporting position,
 opposed complementary bottle restraining and stabilizing nest defining portions beneath said supporting surfaces movable inwardly and outwardly in a lower arcuate path between a bottle restraining and stabilizing nest defining position and a non-restraining position,
 means operatively connected to said supporting surfaces and said nest portions for moving said supporting surfaces inwardly and outwardly while the nest portions respectively simultaneously move outwardly and inwardly,
 a moving conveyor beneath said bottle restraining and stabilizing nest defining position of said complementary nest portions, said apparatus being so arranged and constructed that a bottle is supported in an upright position by said supporting surfaces when said surfaces are in one location of said upper path and is released downwardly when said surfaces are in another location of said upper path and said bottle contacts said conveyor and is restrained and stabilized thereon when said nest portions are in one location of said lower path and then released onto said conveyor when said nest portions are in another location.

13. The apparatus of claim 12 wherein said bottle supporting surfaces include arcuate bottle camming and supporting surfaces so arranged and constructed that as said surfaces move inwardly in said upper path they supportingly raise a bottle.

* * * * *

UNITED STATES PATENT AND TRADEMARK OFFICE
CERTIFICATE OF CORRECTION

PATENT NO. : 3,998,320
DATED : December 21, 1976
INVENTOR(S) : Noel B. Eggert

It is certified that error appears in the above-identified patent and that said Letters Patent are hereby corrected as shown below:

Claim 10, column 6, line 57, after the word "and" insert

--restraining nest portions at a lower portion,--

Signed and Sealed this

Twenty-sixth Day of April 1977

[SEAL]

Attest:

RUTH C. MASON
*Attesting Officer*

C. MARSHALL DANN
*Commissioner of Patents and Trademarks*